July 22, 1958 — F. L. HALL — 2,844,182
INFLATING VALVE

Filed Sept. 14, 1953 — 2 Sheets-Sheet 1

INVENTOR.
FRANK L. HALL
BY
R. L. Miller
ATTORNEY

July 22, 1958  F. L. HALL  2,844,182
INFLATING VALVE
Filed Sept. 14, 1953  2 Sheets-Sheet 2

INVENTOR.
FRANK L. HALL
BY
R. L. Miller
ATTORNEY

United States Patent Office 2,844,182
Patented July 22, 1958

---

2,844,182

INFLATING VALVE

Frank L. Hall, Palos Verdes Estates, Calif., assignor, by mesne assignments, to The Goodyear Tire & Rubber Company, a corporation of Ohio Application September 14, 1953, Serial No. 379,869

3 Claims. (Cl. 152—427)

The present invention relates to a form of inflating valve assembly. More particularly, the invention is concerned with a novel type of device or attachment for use on a valve stem for adapting a pneumatic tire for use in any position on the usual dual tire mounting.

The attachment of the present invention is especially well adapted to render a pneumatic tire of non-directional tread pattern capable of universal mounting in any position on a dual tire and wheel assembly. In the case of dual mountings of tires having directional tread patterns and equipped with the device of the present invention, a greater range or latitude of interchangeability is possible over tires not so equipped.

Non-directional tires equipped with the device of the present invention can be shifted from the inside to the outside of a dual wheel or from one side to the other of the vehicle without a complete replacing of the valve assembly that is normally required. Tires with a directional tread pattern in a dual assembly that are similarly equipped with the device of the present invention likewise have a greater range of positions on the vehicle over directional tread tires not so equipped. Thus it is unnecessary to mount and store extra tires to suit varying circumstances and problems arising out of the operation and maintenance of heavy vehicular equipment with dual wheel assemblies.

It is an object of the present invention to provide a form of accessory which will render tire equipment having non-directional tread patterns capable of universal application to vehicles having dual tire wheel assemblies.

It is also an object of the present invention to provide a device which will enable the mounting of pneumatic tires having directional tread patterns in position on a dual-tired vehicle not possible with directional-tread tires not so equipped.

It is a further object of the invention to provide a means of adapting a tire to substantially universal use without complete dismantling of the tire and inner tube to provide the proper position of the inflating valve.

Still another object of the invention is to reduce the possibility of extension failures common to present practices by moving the valve extension connection from underneath the rim driving lug to a more central position between the rim flanges below the rim base.

Other important objects and advantages of the present invention will be apparent from the following description of one embodiment of the invention as illustrated in the accompanying drawings.

Fig. 1 of the drawing is an elevation with parts broken away of a dual tire assembly embodying the teachings of the present invention;

Figure 1:
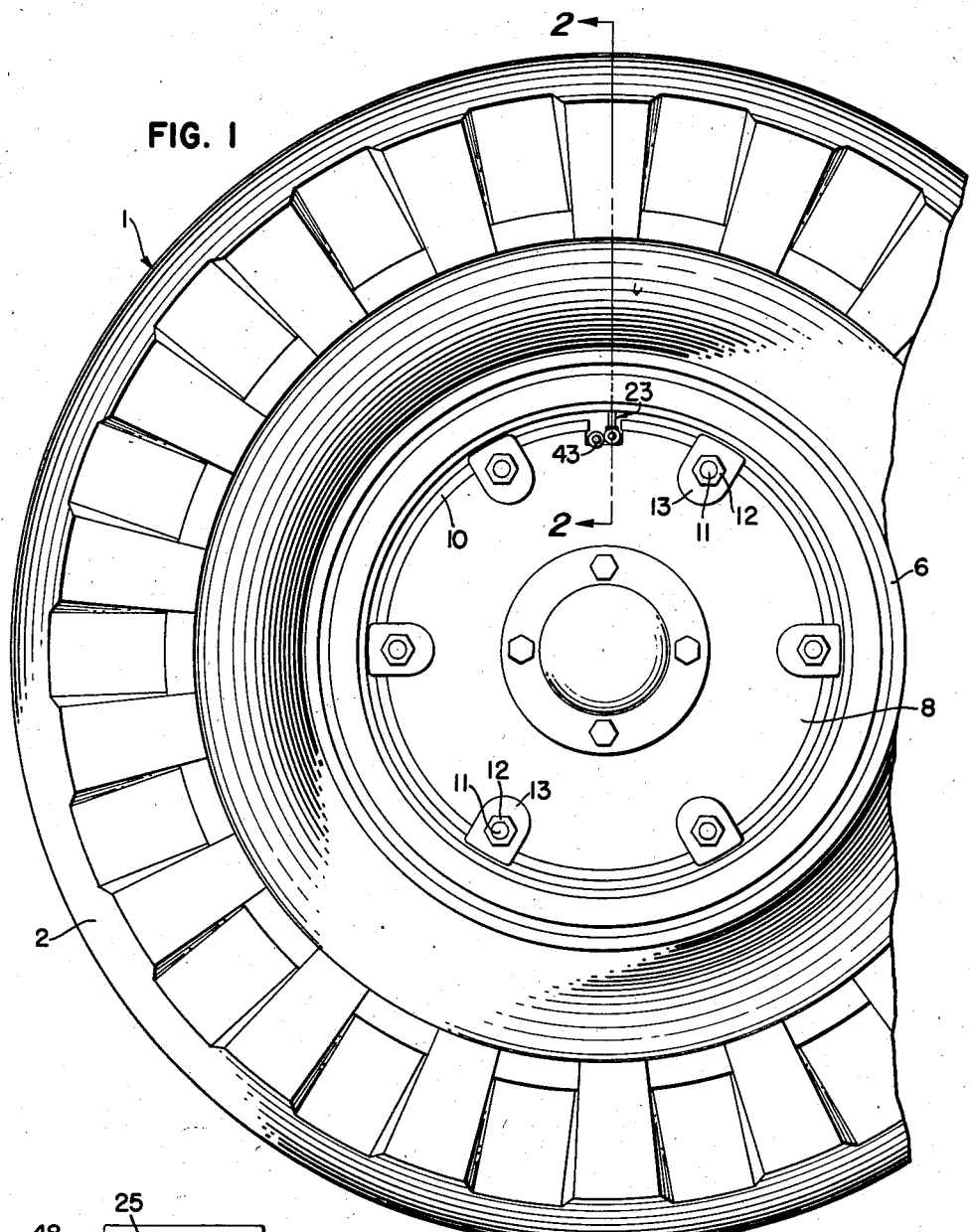
Figure 2:
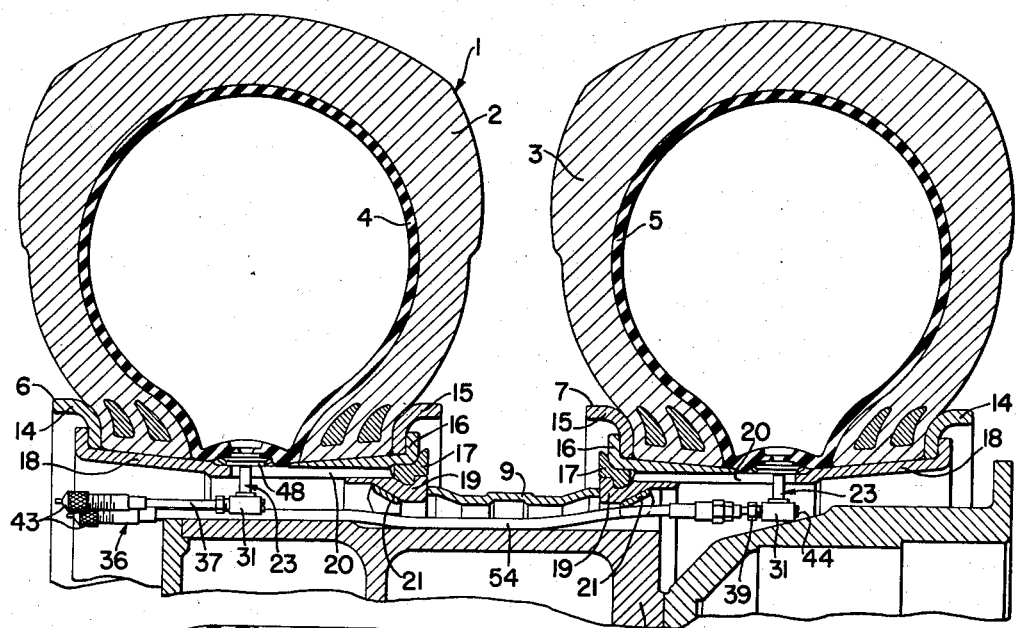
Fig. 2 represents a partial section of the dual tire and rim assembly as seen from line 2—2 of Fig. 1.

Referring first to Figs. 1 and 2 of the drawings, the numeral 1 identifies a dual tire assembly generally. Such an assembly, used in truck, bus, earthmoving and other heavy equipment operations and to which one form of the present invention is advantageously adapted to be employed, in turn comprises tires 2 and 3, fluid-pressure retaining tubes 4 and 5 and rims 6 and 7 which are in turn mounted in a fixed relation on a wheel 8 by means of a spacer 9, wedge band 10 and studs, nuts and clamps 11, 12, and 13, respectively.

Rims (see Fig. 2) vary as to type and size, depending upon the particular job they are to perform, but are alike from the standpoint of a general cross-sectional contour. In the present instance, rims 6 and 7 of Fig. 2 are of a type designed for prime movers, such as scrapers, wagons, and other large earth-moving equipment, but will serve to illustrate the present invention and its application to all types of rims used in a dual capacity. In other words, the present invention is not limited to any particular style or size of rim.

Referring now to Fig. 2, rims 6 and 7, comprising side flanges 14 and 15, bead seat band 16, locking ring 17, and rim base 18 are identical rims in all respects but are mounted symmetrically opposite for a dual tire assembly such as illustrated.

Rim 6, the outboard rim of the dual assembly, is mounted on wheel 8 with its tapered gutter portion 19 facing in or towards the center of the vehicle. Inner rim 7, being symmetrically opposite to rim 6, is mounted with a like tapered gutter portion 19 facing out or away from the center of the vehicle. The tapered gutter portion 19 primarily provides a groove or recess for seating locking ring 17 but also serves as a wedging face to position the rims 6 and 7 with respect to the wheel by means of wedge band 10, studs 11, nuts 12, and clamps 13, as well as an abutment against which the rims 6 and 7 are drawn when employed in a dual capacity. Spacer 9 serves to position rims 6 and 7 correctly according to wheel and tire size.

Base portion 18 also contains an opening 20 in the form of a slot through which a valve stem or valve stem connector from tubes 4 and 5 projects.

A U-shaped boss, or driving lug 21, located adjacent the inner face of the tapered gutter portion 19 and straddling the valve slot 20, serves to prevent slippage of rims 6 and 7 on wheel 8 by its keyed relation to a slot (not shown) in wheel 8.

In all dual assemblies of tires such as illustrated in Fig. 2 of the drawings, it is necessary for the valve stems of both inner and outer tires to be extended to a position of easy accessibility for inflating, deflating and checking of tire pressures. Usually this position is adjacent the outer edge of the outboard rim. In present-day practices this is accomplished by means of a fixed-to-tube, L-shaped valve stem for the outer tire, which stem is of sufficient length to reach the desired location outside of the wheel area and beneath the rim base, but not extending beyond the plane of the outermost edge of the side flange 14 of the rim 6.

To bring the valve core portion of the inner tire to the same position, an extension is attached to the valve stem of the tube near the driving lug of the inboard wheel and so that it lies adjacent the valve stem of the outer tire as shown in Fig. 2 for the present invention.

Such valve assemblies are subject to frequent damage, particularly the valve extension for the inboard wheel due to the location of the connection of the valve stem extension (beneath or in close proximity to the driving lug).

Another objection to such an assembly is the limitation of interchangeability imposed upon a tire, tube and rim assembly by virtue of the fixed, directional valve stem. It is apparent that in order to install a tire, tube and rim, assembled and inflated as a spare for the inner tire of a dual wheel, in the outer tire position, such an assembly would need to be dismantled, the tube with its directional valve stem be reversed in the tire, and the units reassembled.

The above description of a conventional dual mounting known to the art and forming no part of the present invention, illustrates the problems involved in the dual mountings of tires, the objections of present practices, and the need for a universal mounting such as the present invention contemplates.

Figure 3:
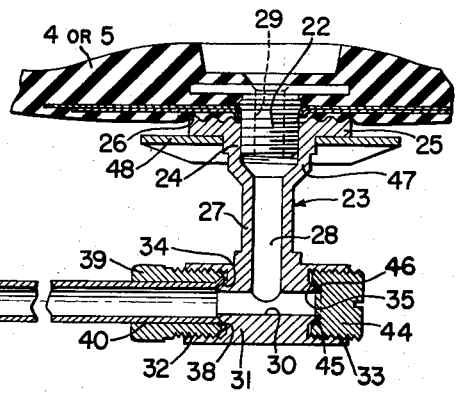
Fig. 3 is an enlarged vertical section of the invention.

Fig. 3 best serves to illustrate the present invention, and shows a threaded spud 22 that is cured to and an integral part of tube 4 or 5. To this is attached an adapter and as shown is T-shaped, or coupling member shown generally by the numeral 23. As illustrated, the T-section adapter 23 comprises a flared, internally threaded end portion 24 for threaded engagement with the spud 22 of the inner tube. A flange-end portion 25 on the outer extremity of flared portion 24 contacts and protects the tube. Sealing ribs or corrugations 26 on the face of the flanged-end portion 25 insure a fluid-tight joint between the T-section adapter 23 and the threaded spud 22 when in assembled relation.

The stem or leg of the T-section adapter 23, designated as 27, has a bore 28 therethrough which connects to a like bore 29 in the threaded spud 22 and a bore 30 in the double-headed or cross-member portion of the T-section 31 for the inflating and deflating of the tube by means hereinafter described.

The double-headed cross-member 31 of T-section adapter 23 has identical threaded bores or recesses 32 and 33 in the opposing end portions which terminate in tapered or conical seating portions 34 and 35 respectively. The threaded openings in turn connect to bore 30 forming a continuous interconnecting passage therethrough. As will be apparent, the adapter 23 is mounted on the spud 22 with the cross-member 31 extending generally in axial direction with respect to the wheel.

From Fig. 2 it is evident that the inflating means of a dual tire assembly, to be universal in its application and overcome objections of present practices, must not be limited as to the direction a valve stem projects. This would in turn limit the position of mounting a tire and tube assembly on a rim, and as a result limit the positions of mounting the tire, tube and rim assembly on a wheel. This objection is overcome by means of a selective valve-and-plug arrangement shown in Figs. 2 and 3.

The valve assembly, designated generally by the numeral 36 comprises a stem 37 of any desired length of flexible steel, rubber or plastic tubing, flared at one end as at 38 to seat against taper 34 or 35 of T-section adapter 23 and be sealed in fluid-tight manner by means of a nut 39. Nut 39 with its bore 40 for a slip-fit over the stem 37 is the conventional flared-type tubing nut, a well-known commercial item.

A valve 41, also a well-known commercial item, with threaded portion 42 for retaining a protective cap 43 completes the valve assembly 36.

Also shown in Fig. 3 is the plug 44 with its tapered counterbore 45 matching the tapered seating portion 35 at the junction of bore 30 and threaded bore 33 or cross-member 31 in the double-headed member 31. Plug 44 insures a fluid-tight seal of the end of the T-section adapter 23 opposite valve 36. A lead, rubber or similar deformable ring 46 may also be used to assist in effecting a positive seal.

Figure 4:
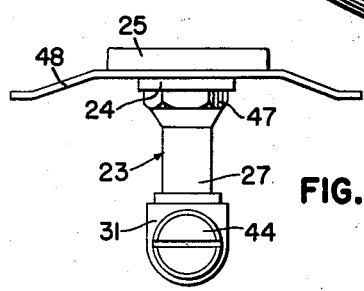
Fig. 4 is an end view detail of the invention.

Fig. 4, an end view of T-section adapter 23, shows how it is possible for the tube with the T-section adapter 23 to be mounted on a rim by inserting the adapter 23 through the slot 20 of rim after being assembled on the spud of the tube. Shown, too, in Fig. 4, is the nut-shaped portion 47 on flared-end 24 to accommodate a wrench (not shown) for assembling T-section adapter 23 to threaded spud 22 in tubes 4 and 5. A conventional bridge plate 48 for spanning the slot 20 in rim base 18 and protecting the tubes 4 and 5 completes the assembly of the T-section adapter 23.

Figure 5:
Fig. 5 is a modification of the invention.

In the modification of the adapter illustrated in Fig. 5, the spud 49 has internal threads 50 to receive the threaded end portion 51 of the adapter 52. A nut 53 on the threaded portion 51 is tightened against the end of the spud 49 to lock the adapter 52 in position on the spud. This form of the invention permits the distance that the adapter 52 extends beyond the rim to be adjusted to fit the particular conditions encountered. It is occasionally necessary to have a minimum extension of the adapter in order to prevent interference with the brake drum or other parts of the wheel. The outer portion of the adapter 52 is similar to that of adapter 23 best illustrated in Fig. 3.

Figure 6:
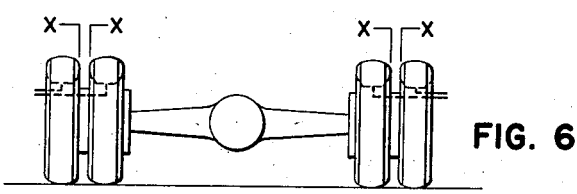
Fig. 6 is a diagrammatic showing of a dual tire assembly having non-directional tread pattern.
Figure 7:
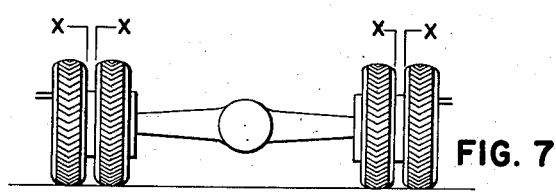
Fig. 7 is a diagrammatic showing of a dual tire assembly having a directional tread pattern.

Figs. 6 and 7 best illustrate the need for a universal tire-inflating valve in operations requiring dual tire assemblies such as the present invention offers, and Figs. 2 and 3 clearly show that by reversing the positions of the valve 36 and plug 44 in the adapter 23, it is possible to change the direction of the extension of the valve 36.

Fig. 2 illustrates the use of the invention in a dual wheel assembly for easy inflating, deflating, and checking of pressures in tubes 4 and 5 of tires 2 and 3. The valves 36 must be brought out from a position within the confines of the wheel and rim structure to a point of easy access by the vehicle operator or attendant. This is done by means of an extension 54 of flexible steel, rubber or plastic tubing joined to valve 36 at one end and to the T-section adapter 23 on the other in a manner similar to the method shown in Fig. 3—i. e. by means of a flared tubing and nut assembly for a pressure-tight seal and threaded-joint engagement with threads 32 and tapered seat 34 of the double-headed cross-member 31. The tube extension 54 of the inboard wheel is of a length so as to bring the outer end to the desired position adjacent the outboard wheel.

Heretofore, in the cases of conventional one-direction, fixed-to-the-tube valve stems, it has also been necessary to make an additional extension for inboard tire and tube assemblies, such as extension 54 of Fig. 2. However, in the case of present practices the joining point for such extensions to valves falls beneath and virtually within the confines of the U-shaped driving lug 21 of rim 7. This has been a source of frequent failures in present-day practices. Not only has coupling or uncoupling of extension members to valves been an annoying undertaking, but very frequently it is the source of considerable damage to either the extension or valve stem, such as a cutting through or a complete shearing of either member. It can be clearly seen from Fig. 2 that the present invention overcomes such objections by making the necessary union of extension 54 and T-section adapter 23 at a point beneath the approximate center of the rim 7 and some distance from driving lug 21.

Figs. 6 and 7 are diagrammatic showings of dual tire assemblies that illustrate more clearly the need for and the value of the present invention. The position of the gutter edge of each is shown by the letter X.

Fig. 6 represents a dual assembly with tires of non-directional tread pattern. A spare assembly consisting of tire, tube and rim for such a dual, non-directional tread set-up of Fig. 5 could normally be placed in any of the four positions shown were it not for direction the valve stem projects in relation to the gutter and split locking ring of the rim (see Fig. 2). Consequently, for such a non-directional dual assembly as shown in Fig. 6, either two spares with valve stems projecting in opposite directions in relation to the gutter portion of the rim would be necessary, or considerable labor and loss of time would be involved in dismounting the tire and reversing the tube in the tire when the tire is used as an inside dual instead of an outside dual, or vice versa. One spare equipped with the device of present invention is all that the non-directional dual assembly of Fig. 6 requires, with never any need for tire dismounting and tube switching.

Fig. 7 shows a dual-tire assembly with tires of a directional tread pattern. Such an assembly with the additional limitation imposed by tread direction would require four spares with the usual valve assemblies, or one tire for each of the four positions. This, it can be seen, would be expensive from the point of additional equipment required as well as storage and handling problems, or in the case of one spare, much labor would be required in dismounting and arranging the tire, tube and rim in the correct relation for position in the dual assembly. With the valve assembly of the present invention, two spares would be required.

In dual-wheel assemblies with either directional or non-directional tires mounted thereon, the spare or spare-wheel assemblies, preferably would be carried with plugs in each bore of the cross member and the extension tubes carried separately. When the need arose for the use of the spare, one of the plugs would be replaced by the proper extension for the particular position at which the tire was to be mounted.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. In a dual wheel assembly having a pair of similar rims oppositely mounted in the inboard and outboard position on the wheel with a tire and tube mounted on each of said rims and a spud on each tube extending through an opening in its respective rim, the combination of a generally T-shaped valve adapter attached to the spud of each tube, each of said adapters comprising a body member, means connecting said body member to the spud in airtight relationship, a pair of oppositely disposed identical end portions on said body member and in the operative position, extending in a substantially axial direction, intercommunicating passageways extending through the body member from each of the end portions and communicating with the interior of the tube through the spud, an extension tube having a valve core in one end thereof removably mounted in one of said end portions, and a plug removably mounted in the other of said end portions thereby providing for interchanging the position of the extension tube and plug in the adapter to selectively control the direction of extension of the extension tube, the valve ends of the extension tubes being positioned in a readily accessible position.

2. In a dual wheel assembly having a pair of similar rims oppositely mounted in the inboard and outboard position on the wheel with a tire and tube mounted on each of said rims and a spud on each tube extending through an opening in its respective rim, the combination of a generally T-shaped valve adapter attached to the spud of each tube, each of said adapters comprising a body member, means connecting said body member to the spud in airtight relationship, a pair of oppositely disposed openings on said body member, each opening in the operative position facing in a substantially axial direction, intercommunicating passageways extending through the body member from each of the openings and communicating with the interior of the tube through the spud, an extension tube having a valve core in one end thereof removably mounted in one of said openings, and a plug removably mounted in the other of said openings thereby providing for interchanging the position of the extension tube and plug in the adapter to selectively control the direction of the extension of the extension tube, the valve end of the extension tube being positioned in a readily accessible position.

3. In a tire and rim assembly with a tire and tube mounted on said rim with a spud on said tube extending through an opening in the rim and including a passageway communicating with the inflation chamber of the tube mounted thereon, the combination of a valve adapter attached to the spud of said tube comprising a generally T-shaped body member with the cross member of the T in the operative position, extending in a substantially axial direction, means connecting said body member in airtight relationship to said spud, an opening on each end of the cross member of the body member and in the operative position, extending in a substantially axial direction, intercommunicating passageways extending through the body member from each of the openings communicating with the passageway of the spud, an extension tube having a valve core in one end thereof and removably mounted at the other end thereof in one of said openings, and a plug removably mounted in the other of said end openings thereby providing for interchanging the position of the extension tube and plug in the adapter to selectively control the direction of extension of the extension tube.

References Cited in the file of this patent

UNITED STATES PATENTS

| | | |
|---|---|---|
| 1,404,754 | Gammeter | Jan. 31, 1922 |
| 1,574,234 | Cummer | Feb. 23, 1926 |
| 1,825,034 | Weatherhead, Jr. | Sept. 29, 1931 |
| 1,951,460 | Williams et al. | Mar. 20, 1934 |
| 1,956,264 | Anderson | Apr. 24, 1934 |
| 2,084,077 | Brunner | June 15, 1937 |
| 2,127,075 | Venosta | Aug. 16, 1938 |
| 2,276,911 | Alward | Mar. 17, 1942 |
| 2,349,594 | McMahan | May 23, 1944 |
| 2,491,150 | Ash | Dec. 13, 1949 |